(12) United States Patent
Sze et al.

(10) Patent No.: US 9,628,798 B2
(45) Date of Patent: Apr. 18, 2017

(54) SIGNALING SIGNED BAND OFFSET VALUES FOR SAMPLE ADAPTIVE OFFSET (SAO) FILTERING IN VIDEO CODING

(71) Applicant: TEXAS INSTRUMENTS INCORPORATED, Dallas, TX (US)

(72) Inventors: Vivienne Sze, Cambridge, MA (US); Madhukar Budagavi, Plano, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 15/357,898

(22) Filed: Nov. 21, 2016

(65) Prior Publication Data

US 2017/0085873 A1 Mar. 23, 2017

Related U.S. Application Data

(63) Continuation of application No. 15/246,167, filed on Aug. 24, 2016, now Pat. No. 9,503,734, which is a continuation of application No. 14/946,148, filed on Nov. 19, 2015, now Pat. No. 9,467,703, which is a continuation of application No. 14/837,961, filed on Aug. 27, 2015, now Pat. No. 9,197,898, which is a continuation of application No. 14/706,657, filed on May 7, 2015, now Pat. No. 9,131,234, which is a continuation of application No. 13/875,273, filed on May 1, 2013, now Pat. No. 9,031,137.

(60) Provisional application No. 61/641,997, filed on May 3, 2012.

(51) Int. Cl.
*H04N 19/00* (2014.01)
*H04N 19/117* (2014.01)
*H04N 19/15* (2014.01)

(52) U.S. Cl.
CPC .......... *H04N 19/117* (2014.11); *H04N 19/15* (2014.11)

(58) Field of Classification Search
CPC ..................................... H04N 19/00
USPC ................... 375/240.02, 240.26, 240.29
See application file for complete search history.

(56) References Cited

U.S. PATENT DOCUMENTS

| | | |
|---|---|---|
| 2013/0022107 A1 | 1/2013 | Van der Auwera et al. |
| 2013/0051454 A1 | 2/2013 | Sze et al. |
| 2015/0071340 A1 | 3/2015 | Andersson et al. |
| 2015/0172666 A1 | 6/2015 | Fu et al. |

OTHER PUBLICATIONS

Thomas Wiegand et al, "WD3: Working draft 3 of High-Efficiency Video Coding", JCTVC-E603, Joint Collaborative Team on Video Coding (JCT-VC) of ITU-T SG16 WP3 and ISO/IEC JTC1/SC29/WG11, pp. 1-215, Mar. 16-23, 2011, Geneva, Switzerland.

Benjamin Bross et al, "WD4: Working Draft 4 of High-Efficiency Video Coding", JCTVC-F803_d6, Joint Collaborative Team on Video Coding (JCT-VC) of ITU-T SG16 WP3 and ISO/IEC JTC1/SC29/WG11, pp. 1-214, Jul. 14-22, 2011.

(Continued)

*Primary Examiner* — Jeffery Williams
(74) *Attorney, Agent, or Firm* — Peter K. McLarty; Charles A. Brill; Frank D. Cimino

(57) ABSTRACT

A method for signaling sample adaptive offset (SAO) band offset syntax elements in a video encoder is provided that includes receiving a plurality of band offset syntax elements, entropy encoding an absolute value of a magnitude of each band offset syntax element in a compressed video bit stream, and entropy encoding a sign of each non-zero band offset syntax element in the compressed video bit stream following the absolute values of the magnitudes.

10 Claims, 5 Drawing Sheets

(56) References Cited

OTHER PUBLICATIONS

Benjamin Bross et al, "Wds: Working Draft 5 of High-Efficiency Video Coding", JCTVC-G1103_d9, Joint Collaborative Team on Video Coding (JCT-VC) of ITU-T SG16 WP3 and ISO/IEC JTC1/SC29/WG11, pp. 1-223, Nov. 21-30, 2011 Geneva, Switzerland.

Benjamin Bross et al, "High Efficiency Video Coding (HEVC) Text Specification Draft 6", JCTVC-H1003, Joint Collaborative Team on Video Coding (JCT-VC) of ITU-T SG16 WP3 and ISO/IEC JTC1/SC29/WG11, pp. 1-249, Nov. 21-30, 2011, Geneva, Switzerland.

Benjamin Bross et al, "High Efficiency Video Coding (HEVC) Text Specification Draft 8", JCTVC-J1003_d7, Joint Collaborative Team on Video Coding (JCT-VC) of ITU-T SG16 WP3 and ISO/IEC JTC1/SC29/WG11, pp. 1-249, Jul. 11-20, 2012, Stockholm, Sweden.

Benjamin Bross et al, "High Efficiency Video Coding (HEVC) Text Specification Draft 9", JCTVC-K1003_v13, Joint Collaborative Team on Video Coding (JCT-VC) of ITU-T SG16 WP3 and ISO/IEC JTC1/SC29/WG11, pp. 1-293, Oct. 10-19, 2012, Shanghai, China.

Benjamin Bross et al, "High Efficiency Video Coding (HEVC) Text Specification Draft 7", JCTVC-I1003_d9, Joint Collaborative Team on Video Coding (JCT-VC) of ITU-T SG16 WP3 and ISO/IEC JTC1/SC29/WG11, pp. 1-256, Apr. 27-May 7, 2012, Geneva, Switzerland.

Chih-Ming Fu et al, "Non-CE1: Bug-Fix of Offset Coding in SAO Interleaving Mode", JCTVC-I0168, Joint Collaborative Team on Video Coding (JCT-VC) of ITU-T SG16 WP3 and ISO/IEC JTC1/SC29/WG11, pp. 1-3, Apr. 27-May 7, 2012, Geneva, Switzerland.

Chih-Ming Fu et al, "Non-CE1: Bug-Fix of Offset Coding in SAO Interleaving Mode", JCTVC-I0168_CD_r1, Joint Collaborative Team on Video Coding (JCT-VC) of ITU-T SG16 WP3 and ISO/IEC JTC1/SC29/WG11, pp. 1-3, Apr. 27-May 7, 2012, Geneva, Switzerland.

"TMS320DM6467 Digital Media System-on-Chip", SPRS403G, Texas Instruments Incorporated, Dec. 2007, revised Oct. 2010, pp. 1-355.

SIGNALING SIGNED BAND OFFSET VALUES FOR SAMPLE ADAPTIVE OFFSET (SAO) FILTERING IN VIDEO CODING

CROSS-REFERENCE TO RELATED APPLICATIONS

This application is a continuation of application Ser. No. 15/246,167, filed Aug. 24, 2016, which is a continuation of application Ser. No. 14/946,148, filed Nov. 19, 2015 (now U.S. Pat. No. 9,467,703), which is a continuation of application Ser. No. 14/837,961, filed Aug. 27, 2015 (now U.S. Pat. No. 9,197,898), which is a continuation of application Ser. No. 14/706,657, filed May 7, 2015 (now U.S. Pat. No. 9,131,234), which is a continuation of application Ser. No. 13/875,273, filed May 1, 2013 (now U.S. Pat. No. 9,031,137), which claims the benefit of U.S. Provisional Patent Application Ser. No. 61/641,997, filed May 3, 2012, which are incorporated herein by reference in their entirety.

BACKGROUND OF THE INVENTION

Field of the Invention

Embodiments of the present invention generally relate to signaling of signed band offset values for sample adaptive offset (SAO) filtering in video coding.

Description of the Related Art

The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). Similar to previous video coding standards such as H.264/AVC, HEVC is based on a hybrid coding scheme using block-based prediction and transform coding. First, the input signal is split into rectangular blocks that are predicted from the previously decoded data by either motion compensated (inter) prediction or intra prediction. The resulting prediction error is coded by applying block transforms based on an integer approximation of the discrete cosine transform, which is followed by quantization and coding of the transform coefficients.

In a coding scheme that uses block-based prediction, transform coding, and quantization, some characteristics of the compressed video data may differ from the original video data. For example, discontinuities referred to as blocking artifacts can occur in the reconstructed signal at block boundaries. Further, the intensity of the compressed video data may be shifted. Such intensity shift may also cause visual impairments or artifacts. To help reduce such artifacts in decompressed video, the emerging HEVC standard defines three in-loop filters: a deblocking filter to reduce blocking artifacts, a sample adaptive offset filter (SAO) to reduce distortion caused by intensity shift, and an adaptive loop filter (ALF) to minimize the mean squared error (MSE) between reconstructed video and original video. These filters may be applied sequentially, and, depending on the configuration, the SAO and ALF loop filters may be applied to the output of the deblocking filter.

SUMMARY

Embodiments of the present invention relate to methods, apparatus, and computer readable media for signaling of signed band offset values for sample adaptive offset (SAO) filtering in video coding. In one aspect, a method for signaling sample adaptive offset (SAO) band offset syntax elements in a video encoder is provided that includes receiving a plurality of band offset syntax elements, entropy encoding an absolute value of a magnitude of each band offset syntax element in a compressed video bit stream, and entropy encoding a sign of each non-zero band offset syntax element in the compressed video bit stream following the absolute values of the magnitudes.

In one aspect, a method for decoding sample adaptive offset (SAO) band offset syntax elements in a video decoder is provided that includes entropy decoding an absolute value of a magnitude of each band offset syntax element of a plurality of band offset syntax elements from a compressed video bit stream, and entropy decoding a sign of each non-zero band offset syntax element from the compressed video bit stream, wherein signs are signaled after the absolute values of the magnitudes in the compressed video bit stream.

In one aspect, an apparatus configured to signal sample adaptive offset (SAO) band offset syntax elements during encoding of a video sequence is provided that includes means for receiving a plurality of band offset syntax elements, means for entropy encoding an absolute value of a magnitude of each band offset syntax element in a compressed video bit stream, and means for entropy encoding a sign of each non-zero band offset syntax element in the compressed video bit stream following the absolute values of the magnitudes.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Figure 1:
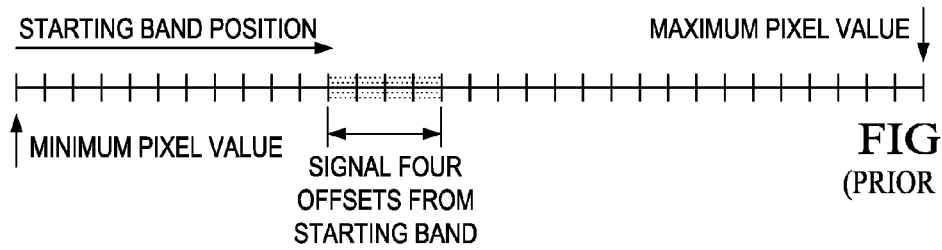
FIG. 1 illustrates band offset (BO) classification in sample adaptive offset (SAO) filtering.

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments are described herein in reference to HEVC. One of ordinary skill in the art will understand that embodiments of the invention are not limited to HEVC.

In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be, for example, 4×4, 8×8, 16×16, and 32×32. The sizes of the transforms units and prediction units for a CU are determined by the video encoder during prediction based on minimization of rate/distortion costs.

Various versions of HEVC are described in the following documents, which are incorporated by reference herein: T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, Mar. 16-23, 2011 ("WD3"), B. Bross, et al., "WD4: Working Draft 4 of High-Efficiency Video Coding," JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding," JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), B. Bross, et al., "High Efficiency Video Coding (HEVC) Text Specification Draft 6," JCTVC-H1003_dK, Joint Collaborative Team on Video Coding (JCT-VC) of ITU-T SG16 WP3 and ISO/IEC JTC1/SC29/WG1, San Jose, Calif., Feb. 1-10, 2012, ("HEVC Draft 6"), B. Bross, et al., "High Efficiency Video Coding (HEVC) Text Specification Draft 7," JCTVC-11003_d9, Joint Collaborative Team on Video Coding (JCT-VC) of ITU-T SG16 WP3 and ISO/IEC JTC1/SC29/WG1, Geneva, CH, Apr. 17-May 7, 2012 ("HEVC Draft 7"), B. Bross, et al., "High Efficiency Video Coding (HEVC) Text Specification Draft 8," JCTVC-J1003_d7, Joint Collaborative Team on Video Coding (JCT-VC) of ITU-T SG16 WP3 and ISO/IEC JTC1/SC29/WG1, Stockholm, SE, Jul. 11-20, 2012 ("HEVC Draft 8"), and B. Bross, et al., "High Efficiency Video Coding (HEVC) Text Specification Draft 9," JCTVC-K1003_v13, Joint Collaborative Team on Video Coding (JCT-VC) of ITU-T SG16 WP3 and ISO/IEC JTC1/SC29/WG1, Shanghai, CN, Oct. 10-19, 2012 ("HEVC Draft 9").

As previously mentioned, a sample adaptive offset (SAO) in-loop filter is one of the in-loop filters included in the emerging HEVC standard. These in-loop filters are applied in the encoder and the decoder. SAO may be applied to reconstructed pixels after application of a deblocking filter. In general, SAO involves adding an offset to compensate for intensity shift directly to a reconstructed pixel. The value of the offset depends on the local characteristics surrounding the pixel, i.e., edge direction/shape and/or pixel intensity level. There are two kinds of offsets that may be applied: band offsets (BO) and edge offsets (EO).

To determine band offsets, pixels are classified by intensity level of the corresponding reconstructed pixels. For example, as illustrated in FIG. 1, to determine band offsets, reconstructed pixels are classified into multiple bands where each band contains pixels in the same intensity interval. That is, the intensity range is equally divided into 32 bands from zero to the maximum intensity value (e.g., 255 for 8-bit pixels). Pixels are classified into the bands based on the five most significant bits of the pixel value. An offset for a band may be computed as an average of the differences between the original pixel values and the reconstructed pixel values of the pixels in the color component classified into the band. Starting from the band with the minimum pixel value, each four adjacent bands are grouped together and each group is indicated by its most left band position (i.e., the minimum band in the group) as shown in FIG. 1. Each group of four adjacent bands is considered to find the group with the maximum distortion reduction based on the offset of each band. The encoder signals the band position (sao_band_position) and four offset (sao_offset_abs, sao_offset_sign) values to the decoder. At the decoder, all bands are assigned a value of zero. The four offset values are then assigned to the band at the first band position (i.e., starting band k) and the subsequent three larger bands (k+1, k+2, k+3). To apply the filter, deblocked output pixels are mapped to a band using the first 5 MSB of the pixel value, and the signed offset in that band is added to the pixel value.

Figure 2A:
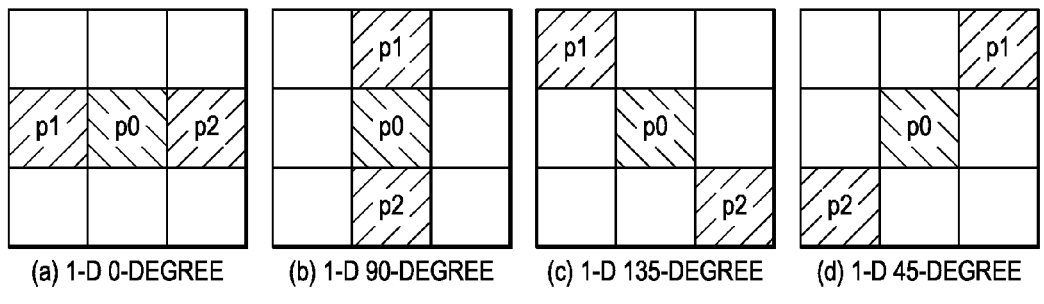
FIG. 2A illustrates edge offset (EO) classification patterns in SAO filtering.
Figure 2B:
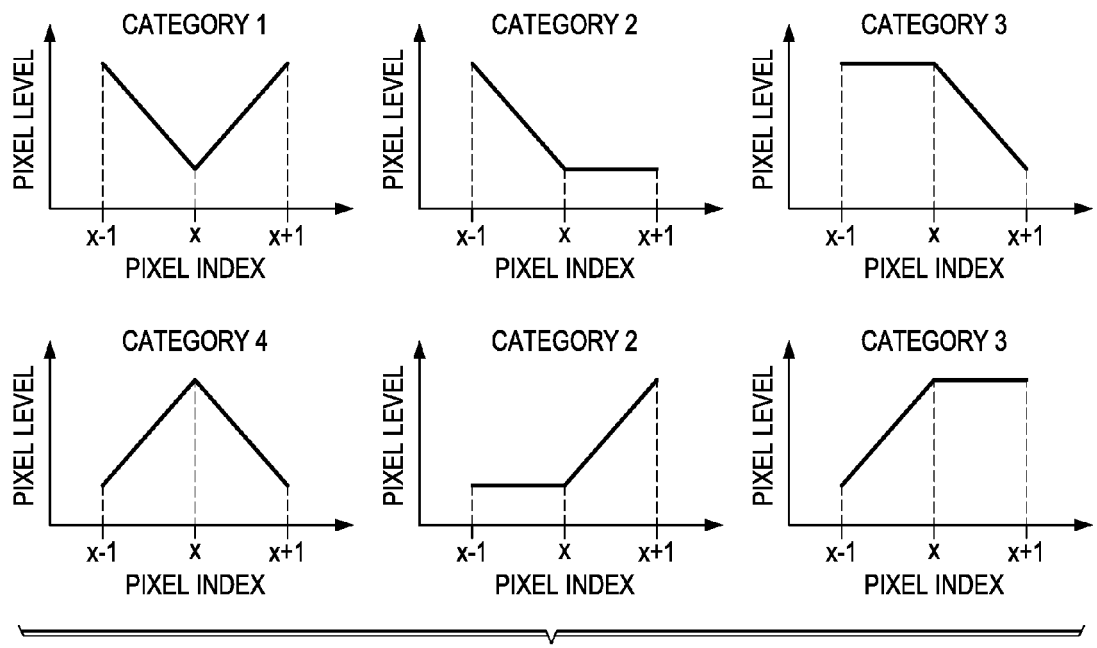
FIG. 2B illustrates edge types by EO category.

To determined edge offsets, reconstructed pixels are classified based on a one dimensional (1-D) delta calculation. That is, the pixels can be filtered in one of four edge directions (0, 90, 135, and 45) as shown in FIG. 2A. For each edge direction, a pixel is classified into one of five categories based on the intensity of the pixel relative to neighboring pixels in the edge direction. Categories 1-4 each represent specific edge shapes as shown in FIG. 2B while category 0 is indicative that none of these edge shapes applies. Offsets for each of categories 1-4 are also computed after the pixels are classified.

More specifically, for each edge direction, a category number c for a pixel is computed as $c=\text{sign}(p0-p1)+\text{sign}(p0-p2)$ where p0 is the pixel and p1 and p2 are neighboring pixels as shown in FIG. 2A. The edge conditions that result in classifying a pixel into a category are shown in Table 1 and are also illustrated in FIG. 2B. After the pixels are classified, offsets are generated for each of categories 1-4. The offset for a category may be computed as an average of the differences between the original pixel values and the reconstructed pixel values of the pixels in the region classified into the category.

TABLE 1

| Category | Condition |
|---|---|
| 1 | p0 < p1 and p0 < p2 |
| 2 | (p0 < p1 and p0 = p2) or (p0 < p2 and p0 = p1) |
| 3 | (p0 > p1 and p0 = p2) or (p0 > p2 and p0 = p1) |
| 4 | p0 > p1 and p0 > p2 |
| 0 | none of above |

The encoder decides which of the SAO filter types is to be used for each color component, i.e., Y, Cb, and Cr, of a picture. In early versions of HEVC, the encoder partitions a picture into LCU aligned regions and determines SAO filter types and offsets for the color components in the regions. Later versions provide for determining the SAO filter type and offsets for color components at the LCU level.

The encoder may use any suitable criteria for selecting the SAO filter types for the color components. For example, the encoder may decide the best SAO filter type and associated offsets for each color component based on a rate distortion technique that estimates the coding cost resulting from the use of each SAO filter type. More specifically, for each color component, the encoder may estimate the coding costs of SAO parameters, e.g., the SAO filter type and SAO offsets, resulting from using each of the predefined SAO filter types for the color component. The encoder may then select the option with the best coding cost for the color component. Versions of HEVC that provide for determining the SAO filter type and offsets at the LCU level provide an option for "merging" LCUs for purposes of signaling SAO parameters in the compressed bit stream. In addition to directly determining the best SAO filter type and offsets for the color components of an LCU, the encoder may also consider the coding costs resulting from using the SAO parameters of corresponding color components in left and upper neighboring LCUs (if these neighboring LCUs are available). If the SAO parameters of one of the neighboring LCUs provide the best coding cost, one or more merge flags (one per color component as appropriate) are signaled in the compressed bit stream rather than directly signaling SAO parameters.

The encoder signals SAO parameters such as the SAO filter type for each color component, and the offsets for each color component in the encoded bit stream. Table 2 is one example illustrating the types and number of offsets that may be signaled for each color component. More specifically, Table 2 shows the SAO filter types and the number of SAO offsets that are signaled for each filter type in a prior art version of HEVC. Table 3 is pseudo code illustrating the prior art signaling order of SAO parameters. In this pseudo code, sao_type_idx is the type of SAO filtering to be used (as selected by the encoder) and is taken from the SAO type column of Table 2, sao_band_position is the starting band of the four consecutive bands for BO filtering, sao_offset_abs is vector of the absolute values of the magnitudes of the four offsets, and sao_offset_sign is a vector of signs corresponding to the offset values. As can be seen from this pseudo code, if the SAO filter type is band offset (SAO type=5), the type is signaled, followed by the band position, followed by the signs for each of the four band offsets, followed by the absolute values of the magnitudes of the four offsets. If the SAO filter type is any of the EO types, the type and the four offsets are signaled. Note that this approach to signaling the SAO parameters requires that the signs are signaled before the offsets when BO filtering is used, and that a sign be signaled even if the corresponding offset value is zero.

TABLE 2

| SAO type | SAO filter type to be used | Number of offsets |
| --- | --- | --- |
| 0 | None | 0 |
| 1 | 1-D 0-degree pattern edge offset | 4 |
| 2 | 1-D 90-degree pattern edge offset | 4 |
| 3 | 1-D 135-degree pattern edge offset | 4 |
| 4 | 1-D 45-degree pattern edge offset | 4 |
| 5 | band offset | 4 |

TABLE 3

```
sao_offset_cabac( rx, ry, cldx ) {
  sao_type_idx[ cldx ][ rx ][ ry ]
  if( sao_type_idx[ cldx ][ rx ][ ry ] = =5 )
  {
    sao_band_position[ cldx ][ rx ][ ry ]
    for( i = 0; i < 4; i++ )
      sao_offset_sign[ cldx ][ rx][ ry ][ i ]
  }
  if( sao_type_idx[ cldx ][ rx ][ ry ] != 0 )
    for( i = 0; i < 4; i++ )
      sao_offset_abs[ cldx ][ rx][ ry ][ i ]
}
```

Embodiments of the invention provide for signaling the sign values of non-zero SAO band offsets after the magnitudes are signaled. In addition, sign values are not signaled for zero value offsets. Table 4 is example pseudo code illustrating an embodiment of the signaling order of SAO parameters assuming the previously described SAO filtering. In this pseudo code, sao_type_idx is the type of SAO filtering to be used (as selected by the encoder) and is taken from the SAO type column of Table 2, sao_band_position is the starting band of the four consecutive bands for BO filtering, sao_offset_abs is vector of the absolute values of the magnitudes of the four offsets, and sao_offset_sign is a vector of signs corresponding to the offset values. As can be seen from this pseudo code, if the SAO filter type is band offset (SAO type=5), the type is signaled, followed by the band position, followed by the absolute values of the magnitudes of the four offsets. After the four offsets are signaled, the signs for any non-zero offset values are signaled. If the SAO filter type is any of the EO types, the type and the four offsets are signaled.

TABLE 4

```
sao_offset_cabac( rx, ry, cldx ) {
  sao_type_idx[ cldx ][ rx ][ ry ]
  if( sao_type_idx[ cldx ][ rx ][ ry ] ! = 0)
    for( i = 0; i < 4; i++ )
      sao_offset_abs[ cldx ][rx][ ry ][ i ]
  if( sao_type_idx[ cldx ][ rx][ ry ] = =5 ) {
    sao_band_position[ cldx ][ rx ][ ry ]
    for( i = 0; i < 4; i++ )
    {
      if (sao_offset_abs[ cldx ][ rx][ry ][ i ]!=0)
        sao_offset_sign[ cldx][ rx][ ry ][ i ]
    }
  }
}
```

Figure 3:
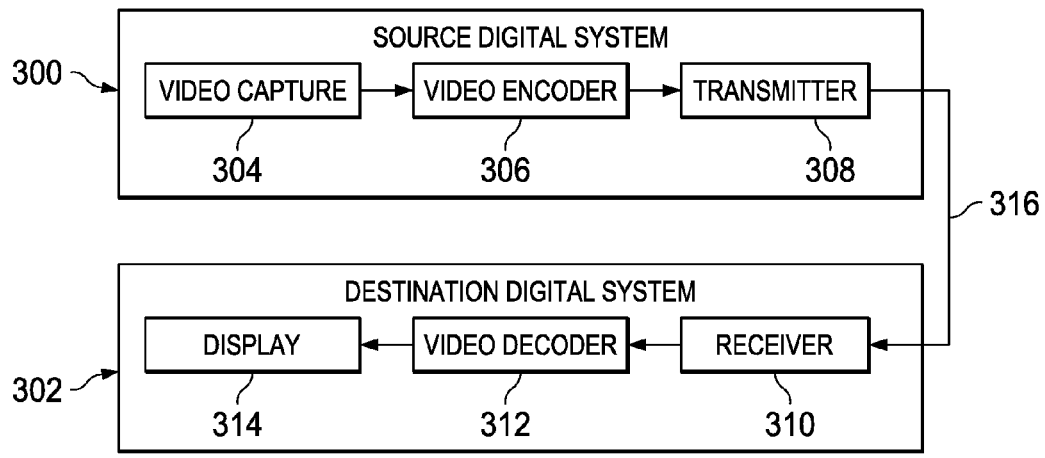
FIG. 3 is a block diagram of a digital system.

FIG. 3 shows a block diagram of a digital system that includes a source digital system 300 that transmits encoded video sequences to a destination digital system 302 via a communication channel 316. The source digital system 300 includes a video capture component 304, a video encoder component 306, and a transmitter component 308. The video capture component 304 is configured to provide a video sequence to be encoded by the video encoder component 306. The video capture component 304 may be, for example, a video camera, a video archive, or a video feed from a video content provider. In some embodiments, the video capture component 304 may generate computer graphics as the video sequence, or a combination of live video, archived video, and/or computer-generated video.

The video encoder component 306 receives a video sequence from the video capture component 304 and encodes it for transmission by the transmitter component 308. The video encoder component 306 receives the video sequence from the video capture component 304 as a sequence of pictures, divides the pictures into largest coding units (LCUs), and encodes the video data in the LCUs. The video encoder component 306 may be configured to perform signaling of SAO signed band offset values during the encoding process as described herein. An embodiment of the video encoder component 306 is described in more detail herein in reference to FIG. 4.

The transmitter component 308 transmits the encoded video data to the destination digital system 302 via the communication channel 316. The communication channel 316 may be any communication medium, or combination of communication media suitable for transmission of the encoded video sequence, such as, for example, wired or wireless communication media, a local area network, or a wide area network.

The destination digital system 302 includes a receiver component 310, a video decoder component 312 and a display component 314. The receiver component 310 receives the encoded video data from the source digital system 300 via the communication channel 316 and provides the encoded video data to the video decoder component 312 for decoding. The video decoder component 312 reverses the encoding process performed by the video encoder component 306 to reconstruct the LCUs of the video sequence. The video decoder component 312 may be configured to decode SAO signed band offset values during the decoding process as described herein. An embodiment of the video decoder component 312 is described in more detail below in reference to FIG. 5.

The reconstructed video sequence is displayed on the display component 314. The display component 314 may be any suitable display device such as, for example, a plasma display, a liquid crystal display (LCD), a light emitting diode (LED) display, etc.

In some embodiments, the source digital system 300 may also include a receiver component and a video decoder component and/or the destination digital system 302 may include a transmitter component and a video encoder component for transmission of video sequences both directions for video streaming, video broadcasting, and video telephony. Further, the video encoder component 306 and the video decoder component 312 may perform encoding and decoding in accordance with one or more video compression standards. The video encoder component 306 and the video decoder component 312 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 4:
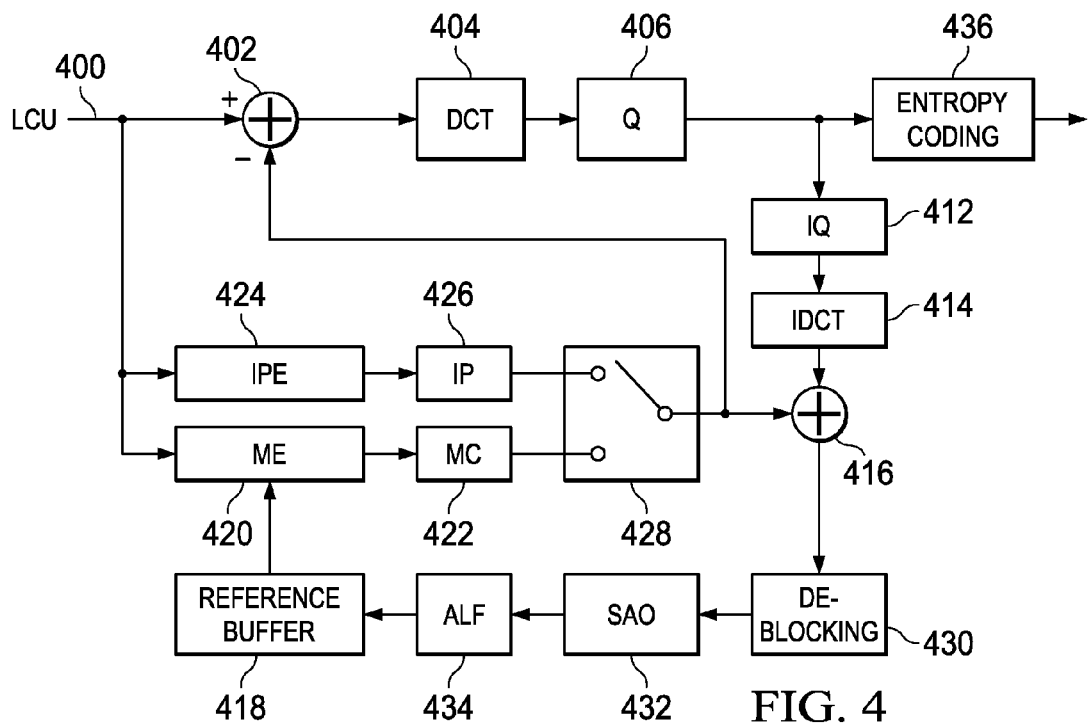
FIG. 4 is a block diagram of a video encoder.

FIG. 4 is a block diagram of the LCU processing portion of an example video encoder. A coding control component (not shown) sequences the various operations of the LCU processing, i.e., the coding control component runs the main control loop for video encoding. The coding control component receives a digital video sequence and performs any processing on the input video sequence that is to be done at the picture level, such as determining the coding type (I, P, or B) of a picture based on the high level coding structure, e.g., IPPP, IBBP, hierarchical-B, and dividing a picture into LCUs for further processing.

In addition, for pipelined architectures in which multiple LCUs may be processed concurrently in different components of the LCU processing, the coding control component controls the processing of the LCUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different LCUs of a picture at any given time. That is, the slave processing modules are executed in parallel, each processing its respective LCU while data movement from one processor to another is serial.

The LCU processing receives LCUs 400 of the input video sequence from the coding control component and encodes the LCUs 400 under the control of the coding control component to generate the compressed video stream. The LCUs 400 in each picture are processed in row order. The LCUs 400 from the coding control component are provided as one input of a motion estimation component (ME) 420, as one input of an intra-prediction estimation component (IPE) 424, and to a positive input of a combiner 402 (e.g., adder or subtractor or the like). Further, although not specifically shown, the prediction mode of each picture as selected by the coding control component is provided to a mode decision component 428 and the entropy coding component 436.

The storage component 418 provides reference data to the motion estimation component 420 and to the motion compensation component 422. The reference data may include one or more previously encoded and decoded pictures, i.e., reference pictures.

The motion estimation component 420 provides motion data information to the motion compensation component 422 and the entropy coding component 436. More specifically, the motion estimation component 420 performs tests on CUs in an LCU based on multiple inter-prediction modes (e.g., skip mode, merge mode, and normal or direct inter-prediction), PU sizes, and TU sizes using reference picture data from storage 418 to choose the best CU partitioning, PU/TU partitioning, inter-prediction modes, motion vectors, etc. based on coding cost, e.g., a rate distortion coding cost. To perform the tests, the motion estimation component 420 may divide an LCU into CUs according to the maximum hierarchical depth of the quadtree, and divide each CU into PUs according to the unit sizes of the inter-prediction modes and into TUs according to the transform unit sizes, and calculate the coding costs for each PU size, prediction mode, and transform unit size for each CU. The motion estimation component 420 provides the motion vector (MV) or vectors and the prediction mode for each PU in the selected CU partitioning to the motion compensation component (MC) 422.

The motion compensation component 422 receives the selected inter-prediction mode and mode-related information from the motion estimation component 420 and generates the inter-predicted CUs. The inter-predicted CUs are provided to the mode decision component 428 along with the selected inter-prediction modes for the inter-predicted PUs and corresponding TU sizes for the selected CU/PU/TU partitioning. The coding costs of the inter-predicted CUs are also provided to the mode decision component 428.

The intra-prediction estimation component 424 (IPE) performs intra-prediction estimation in which tests on CUs in an LCU based on multiple intra-prediction modes, PU sizes, and TU sizes are performed using reconstructed data from previously encoded neighboring CUs stored in a buffer (not shown) to choose the best CU partitioning, PU/TU partitioning, and intra-prediction modes based on coding cost, e.g., a rate distortion coding cost. To perform the tests, the intra-prediction estimation component 424 may divide an LCU into CUs according to the maximum hierarchical depth of the quadtree, and divide each CU into PUs according to the unit sizes of the intra-prediction modes and into TUs according to the transform unit sizes, and calculate the coding costs for each PU size, prediction mode, and transform unit size for each PU. The intra-prediction estimation component 424 provides the selected intra-prediction modes for the PUs, and the corresponding TU sizes for the selected CU partitioning to the intra-prediction component (IP) 426. The coding costs of the intra-predicted CUs are also provided to the intra-prediction component 426.

The intra-prediction component 426 (IP) receives intra-prediction information, e.g., the selected mode or modes for the PU(s), the PU size, etc., from the intra-prediction estimation component 424 and generates the intra-predicted CUs. The intra-predicted CUs are provided to the mode decision component 428 along with the selected intra-prediction modes for the intra-predicted PUs and corresponding TU sizes for the selected CU/PU/TU partitioning. The coding costs of the intra-predicted CUs are also provided to the mode decision component 428.

The mode decision component 428 selects between intra-prediction of a CU and inter-prediction of a CU based on the intra-prediction coding cost of the CU from the intra-prediction component 426, the inter-prediction coding cost of the CU from the motion compensation component 422, and the picture prediction mode provided by the coding control component. Based on the decision as to whether a CU is to be intra- or inter-coded, the intra-predicted PUs or inter-predicted PUs are selected. The selected CU/PU/TU partitioning with corresponding modes and other mode related prediction data (if any) such as motion vector(s) and reference picture index (indices), are provided to the entropy coding component 436.

The output of the mode decision component 428, i.e., the predicted PUs, is provided to a negative input of the combiner 402 and to the combiner 438. The associated transform unit size is also provided to the transform component 404. The combiner 402 subtracts a predicted PU from the original PU. Each resulting residual PU is a set of pixel difference values that quantify differences between pixel values of the original PU and the predicted PU. The residual blocks of all the PUs of a CU form a residual CU for further processing.

The transform component 404 performs block transforms on the residual CUs to convert the residual pixel values to transform coefficients and provides the transform coefficients to a quantize component 406. More specifically, the transform component 404 receives the transform unit sizes for the residual CU and applies transforms of the specified sizes to the CU to generate transform coefficients. Further, the quantize component 406 quantizes the transform coefficients based on quantization parameters (QPs) and quantization matrices provided by the coding control component and the transform sizes and provides the quantized transform coefficients to the entropy coding component 436 for coding in the bit stream.

The entropy coding component 436 entropy encodes the relevant data, i.e., syntax elements, output by the various encoding components and the coding control component using context-adaptive binary arithmetic coding (CABAC) to generate the compressed video bit stream. Among the syntax elements that are encoded are picture parameter sets, flags indicating the CU/PU/TU partitioning of an LCU, the prediction modes for the CUs, and the quantized transform coefficients for the CUs. The entropy coding component 436 also entropy encodes relevant data from the in-loop filters, such as the SAO parameters. When the SAO filter type is band offset, the entropy coding component 436 signals the band offsets in the compressed bit stream, followed by the signs of any non-zero band offsets. In some embodiments, the entropy coding component 436 signals the SAO parameters as per the ordering in the example pseudo code of Table 4. In some embodiments, the entropy coding component 436 signals the SAO parameters when the SAO filter type is band offset as per the method of FIG. 6.

The LCU processing includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures.

The quantized transform coefficients for each CU are provided to an inverse quantize component (IQ) 412, which outputs a reconstructed version of the transform result from the transform component 404. The dequantized transform coefficients are provided to the inverse transform component (IDCT) 414, which outputs estimated residual information representing a reconstructed version of a residual CU. The inverse transform component 414 receives the transform unit size used to generate the transform coefficients and applies inverse transform(s) of the specified size to the transform coefficients to reconstruct the residual values. The reconstructed residual CU is provided to the combiner 438.

The combiner 438 adds the original predicted CU to the residual CU to generate a reconstructed CU, which becomes part of reconstructed picture data. The reconstructed picture data is stored in a buffer (not shown) for use by the intra-prediction estimation component 424.

Various in-loop filters may be applied to the reconstructed picture data to improve the quality of the reference picture data used for encoding/decoding of subsequent pictures. The in-loop filters may include a deblocking filter 430, a sample adaptive offset filter (SAO) 432, and an adaptive loop filter (ALF) 434. The in-loop filters 430, 432, 434 are applied to each reconstructed LCU in the picture and the final filtered reference picture data is provided to the storage component 418. In some embodiments, the ALF component 434 is not present.

In general, for each LCU of the reconstructed picture, the SAO filter 432 determines the best offset values, i.e., band offset values or edge offset values, to be added to pixels of that LCU to compensate for intensity shift that may have occurred during the block based coding of the picture, applies the offset values to the reconstructed LCU, and determines the SAO parameter values to be encoded in the bit stream for the LCU. The SAO filter 432 may determine the parameter values in any suitable way. The SAO filter 432 provided the determined SAO parameter values to the entropy coding component 436 to be signaled in the compressed bit stream.

Figure 5:
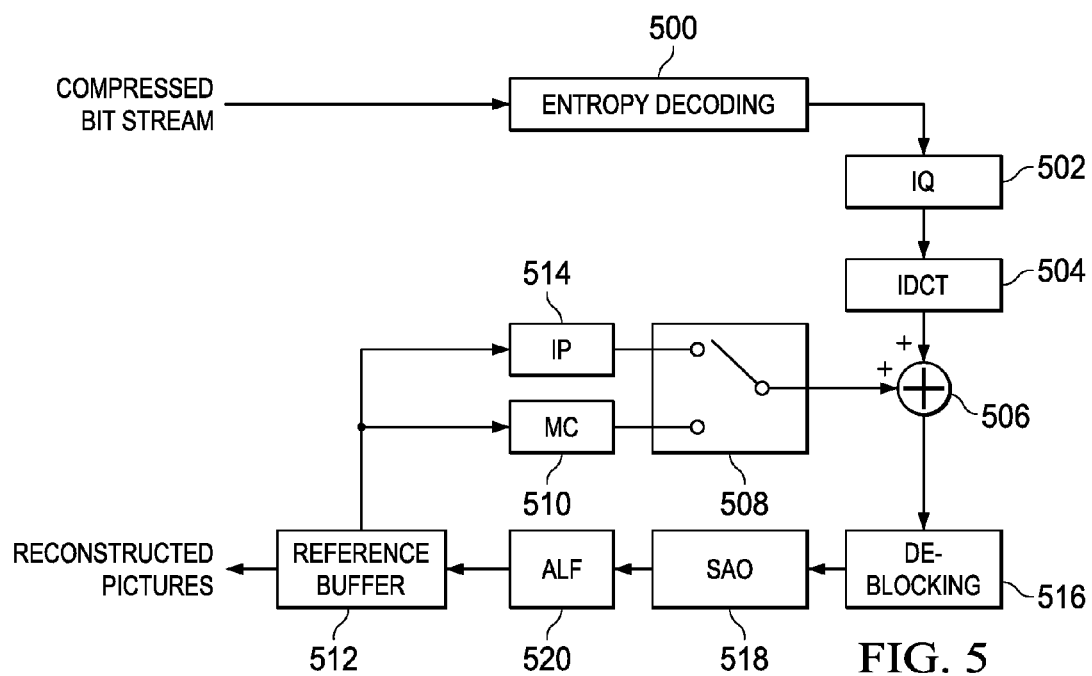
FIG. 5 is a block diagram of a video decoder.

FIG. 5 is a block diagram of an example video decoder. The video decoder operates to reverse the encoding operations, i.e., entropy coding, quantization, transformation, and prediction, performed by the video encoder of FIG. 4 to regenerate the pictures of the original video sequence. In view of the above description of a video encoder, one of ordinary skill in the art will understand the functionality of components of the video decoder without detailed explanation.

The entropy decoding component 500 receives an entropy encoded (compressed) video bit stream and reverses the entropy encoding using CABAC decoding to recover the encoded syntax elements, e.g., CU, PU, and TU structures of LCUs, quantized transform coefficients for CUs, motion vectors, prediction modes, SAO parameters, etc. The decoded syntax elements are passed to the various components of the decoder as needed. For example, decoded prediction modes are provided to the intra-prediction component (IP) 514 or motion compensation component (MC)

510. If the decoded prediction mode is an inter-prediction mode, the entropy decoder 500 reconstructs the motion vector(s) as needed and provides the motion vector(s) to the motion compensation component 510.

In another example, the entropy decoding component 500 provides the decoded SAO parameters to the sample adaptive offset filter (SAO) 518. When the SAO filter type signaled in the compressed bit stream is band offset, the entropy decoding component 500 decodes the band offsets from the compressed bit stream, followed by the signs of any non-zero band offsets, and applies the decoded signs to the corresponding band offsets. In some embodiments, the entropy decoding component 500 decodes the SAO parameters as per the ordering in the example pseudo code of Table 4. In some embodiments, the entropy decoding component 500 decodes the SAO parameters when the SAO filter type is band offset as per the method of FIG. 7.

The inverse quantize component (IQ) 502 de-quantizes the quantized transform coefficients of the CUs. The inverse transform component 504 transforms the frequency domain data from the inverse quantize component 502 back to the residual CUs. That is, the inverse transform component 504 applies an inverse unit transform, i.e., the inverse of the unit transform used for encoding, to the de-quantized residual coefficients to produce reconstructed residual values of the CUs.

A residual CU supplies one input of the addition component 506. The other input of the addition component 506 comes from the mode switch 508. When an inter-prediction mode is signaled in the encoded video stream, the mode switch 508 selects predicted PUs from the motion compensation component 510 and when an intra-prediction mode is signaled, the mode switch selects predicted PUs from the intra-prediction component 514.

The motion compensation component 510 receives reference data from the storage component 512 and applies the motion compensation computed by the encoder and transmitted in the encoded video bit stream to the reference data to generate a predicted PU. That is, the motion compensation component 510 uses the motion vector(s) from the entropy decoder 500 and the reference data to generate a predicted PU.

The intra-prediction component 514 receives reconstructed samples from previously reconstructed PUs of a current picture from the storage component 512 and performs the intra-prediction computed by the encoder as signaled by an intra-prediction mode transmitted in the encoded video bit stream using the reconstructed samples as needed to generate a predicted PU.

The addition component 506 generates a reconstructed CU by adding the predicted PUs selected by the mode switch 508 and the residual CU. The output of the addition component 506, i.e., the reconstructed CUs, is stored in the storage component 512 for use by the intra-prediction component 514.

In-loop filters may be applied to reconstructed picture data to improve the quality of the decoded pictures and the quality of the reference picture data used for decoding of subsequent pictures. The applied in-loop filters are the same as those of the encoder, i.e., a deblocking filter 516, a sample adaptive offset filter (SAO) 518, and an adaptive loop filter (ALF) 520. The in-loop filters may be applied on an LCU-by-LCU basis and the final filtered reference picture data is provided to the storage component 512. In some embodiments, the ALF component 520 is not present.

The deblocking filter 516 applies the same deblocking as performed in the encoder. In general, for each reconstructed LCU, the SAO filter 518 applies the offset values determined by the encoder for the LCU to the pixels of the LCU. More specifically, the SAO filter 518 receives decoded SAO parameters from the entropy decoding component 500 for each reconstructed LCU, and applies the values to the pixels of the LCU according to values of other parameters in the SAO parameter set.

Figure 6:
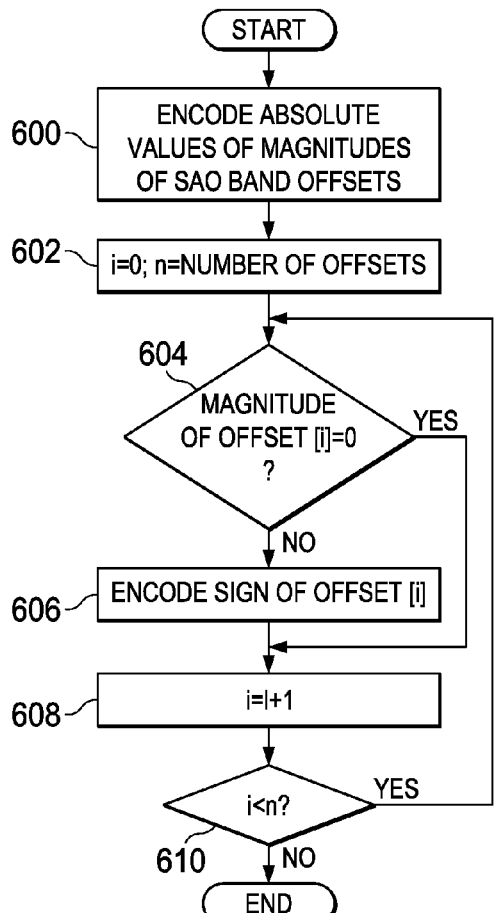
FIG. 6 is a flow diagram of a method for signaling SAO band offset syntax elements.

FIG. 6 is a flow diagram of a method for SAO parameter signaling in a compressed video bit stream when the SAO filter type is BO that may be performed in a video encoder, e.g., the encoder of FIG. 4. This method does not assume any particular number of offsets as the number of offsets is specified by the particular video coding standard in use. For example, in various versions of HEVC, the number of offsets for BO filtering has been has many as 16 and as few as 4. In the method of FIG. 6, initially the absolute values of the magnitudes of all of the SAO band offset values are entropy encoded 600 in the compressed bit stream. Then, the sign of each non-zero offset is entropy encoded in the compressed bit stream 602-610.

Figure 7:
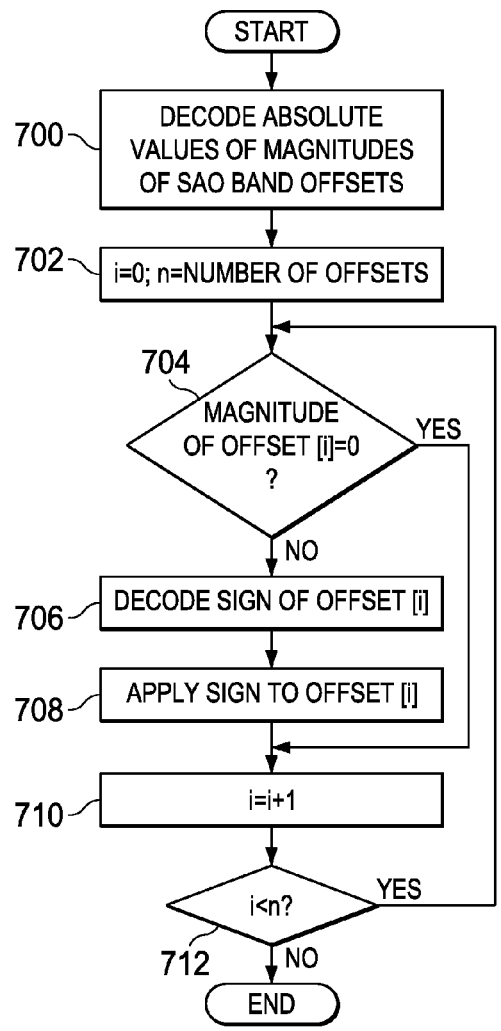
FIG. 7 is a flow diagram of a method for decoding SAO band offset syntax elements.

FIG. 7 is a flow diagram of a method for SAO parameter decoding from a compressed video bit stream when the SAO filter type is BO that may be performed in a video decoder, e.g., the decoder of FIG. 5. This method does not assume any particular number of offsets as the number of offsets is specified by the particular video coding standard in use. For example, in various versions of HEVC, the number of offsets for BO filtering has been has many as 16 and as few as 4. In the method of FIG. 7, initially the absolute values of the magnitudes of all of the SAO band offset values are entropy decoded 700 from the compressed bit stream. Then, the sign of each non-zero offset is entropy decoded from the compressed bit stream and the sign is applied to the magnitude 702-712.

Figure 8:
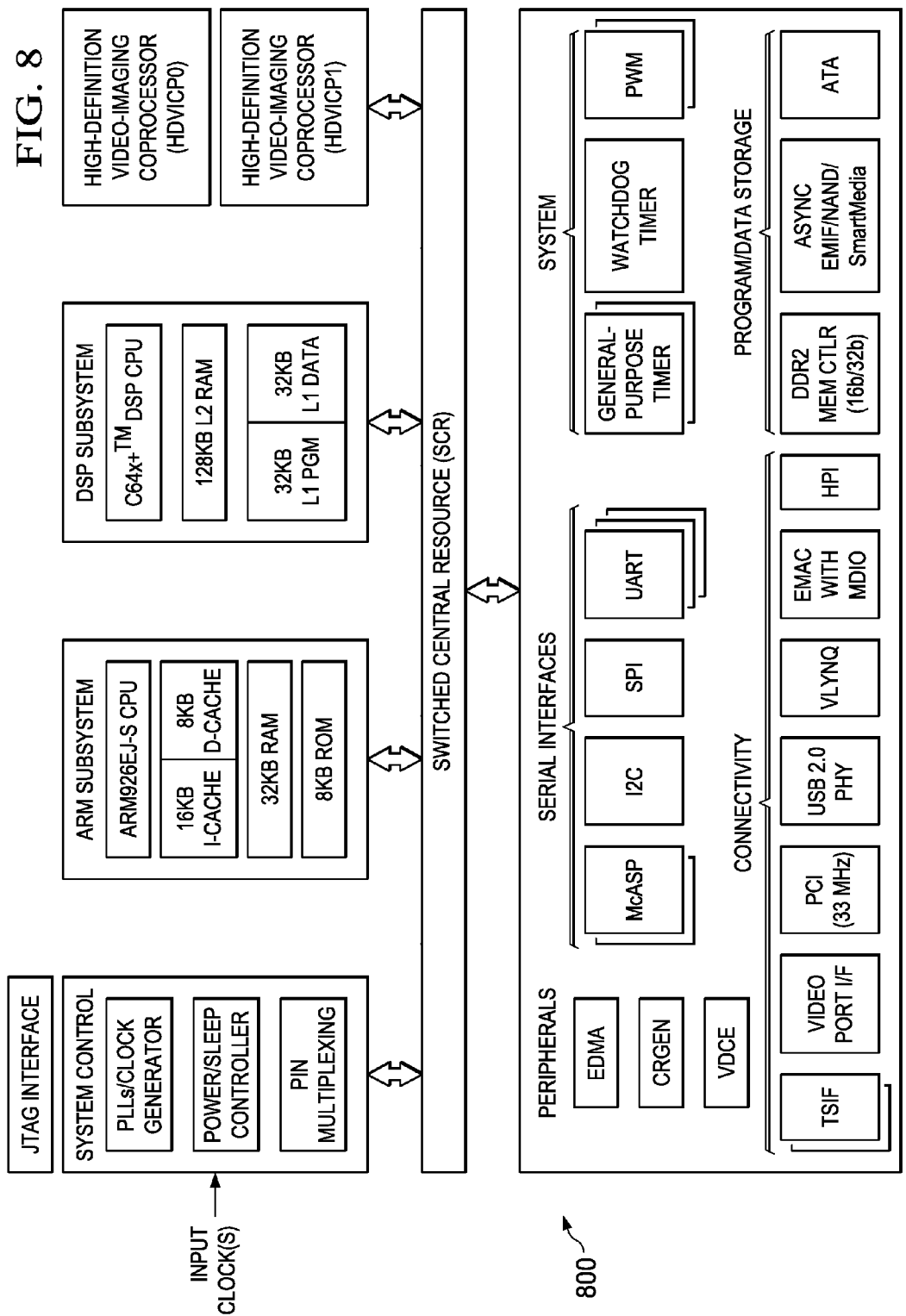
FIG. 8 is a block diagram of an illustrative digital system.

FIG. 8 is a block diagram of an example digital system suitable for use as an embedded system that may be configured to perform SAO parameter signaling of band offset syntax elements as described herein during encoding of a video stream and/or SAO parameter decoding of band offset syntax elements during decoding of an encoded video bit stream. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 800 is a programmable platform designed to meet the processing needs of applications such as video encode/decode/transcode/transrate, video surveillance, video conferencing, set-top box, medical imaging, media server, gaming, digital signage, etc. The SoC 800 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 800 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+TM core with a very-long-instruction-word (VLIW) architecture. In general, the ARM is responsible for configuration and control of the SoC 800, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 800 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 8, the SoC 800 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding such as motion estimation, motion compensation, intra-prediction, transformation, and quantization. Further, the distinct circuitry in the HDVICP coprocessors that may be used for specific computation operations is designed to operate in a pipeline fashion under the control of the ARM subsystem and/or the DSP subsystem.

As was previously mentioned, the SoC 800 may be configured to perform SAO parameter signaling of band offset syntax elements as described herein during encoding of a video stream and/or SAO parameter decoding of band offset syntax elements during decoding of an encoded video bit stream. For example, the coding control of the video encoder of FIG. 4 may be executed on the DSP subsystem or the ARM subsystem and at least some of the computational operations of the block processing, including the intra-prediction and inter-prediction of mode selection, transformation, quantization, and entropy encoding may be executed on the HDVICP coprocessors. At least some of the computational operations of the SAO parameter signaling during encoding of a video stream may also be executed on the HDVICP coprocessors. Similarly, at least some of the computational operations of the various components of the video decoder of FIG. 5, including entropy decoding, inverse quantization, inverse transformation, intra-prediction, and motion compensation may be executed on the HDVICP coprocessors. Further, at least some of the computational operations of the SAO parameter decoding during decoding of an encoded video bit stream may also be executed on the HDVICP coprocessors.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, particular SAO filter types, edge directions, pixel categories, numbers of offset values, etc., drawn from versions of the emerging HEVC standard have been described above. One of ordinary skill in the art will understand embodiments in which the SAO filter types, edge directions, pixel categories, number of offset values, and/or other specific details of SAO filtering differ from the ones described.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A video decoder, comprising:
   a video control component comprising a first processor coupled to a memory;
   an entropy decoder component coupled to the video control component and configured to decode an entropy encoded bit stream;
   an inverse quantization component coupled to the entropy decoding component and configured to de-quantize quantized transform coefficients of residual prediction units obtained from the decoded entropy encoded bit stream;
   an inverse transform component coupled to the inverse quantization component and configured to inverse transform the transform coefficients of residual prediction units from the inverse quantization component from a frequency domain to residual prediction units;
   a motion compensation component coupled to the entropy decoding component and configured to form reconstructed prediction units;
   an adder component coupled to the motion compensation component and the inverse transform component and configured to combine residual prediction units and reconstructed prediction units to form a reconstructed picture;

a deblock filter component comprising a first hardware accelerator, the deblock filter coupled to the adder component and coupled to the video control component and configured to perform deblock filtering on the reconstructed picture;

a SAO filter component comprising a second hardware accelerator, the SAO filter coupled to the deblock filter component and coupled to the video control component, the SAO filter component configured to perform SAO filtering on a first non-overlapping region of the reconstructed picture using first SAO band parameters obtained from the decoded entropy encoded bit stream wherein the first SAO band parameters comprises a first sequence of values of magnitudes of SAO band offsets without sign followed by signs of only the non-zero values of magnitudes of the first SAO band offset values in the decoded entropy encoded bit stream; and the video control component configured to operate the first hardware accelerator and the second hardware accelerator in a pipelined manner.

2. The system of claim 1 where the video control component and the first and second hardware accelerators are implemented on a single integrated circuit.

3. A video decoder, comprising:

a video control component comprising a first processor coupled to a memory;

an entropy decoder component coupled to the video control component and configured to decode an entropy encoded bit stream;

an inverse quantization component coupled to the entropy decoding component and configured to de-quantize quantized transform coefficients of residual prediction units obtained from the decoded entropy encoded bit stream;

an inverse transform component coupled to the inverse quantization component and configured to inverse transform the transform coefficients of residual prediction units from the inverse quantization component from a frequency domain to residual prediction units;

a motion compensation component coupled to the entropy decoding component and configured to form reconstructed prediction units;

an adder component coupled to the motion compensation component and the inverse transform component and configured to combine residual prediction units and reconstructed prediction units to form a reconstructed picture;

a deblock filter component comprising a first hardware accelerator, the deblock filter coupled to the adder component and the video control component and configured to perform deblock filtering on the reconstructed picture;

a SAO filter component comprising a second hardware accelerator, the SAO filter coupled to the deblock filter component and coupled to the video control component, the SAO filter component configured to perform SAO filtering on a first non-overlapping region of the reconstructed picture using first SAO band parameters obtained from the decoded entropy encoded bit stream wherein the first SAO band parameters comprises a first sequence of values of magnitudes of SAO band offsets without sign followed by signs of only the non-zero values of magnitudes of the first SAO band offset values in the decoded entropy encoded bit stream;

the video control component configured to operate the first hardware accelerator and the second hardware accelerator in parallel.

4. The system of claim 3 where the video control component and the first and second hardware accelerators are implemented on a single integrated circuit.

5. A video system, comprising:

a video control component comprising a first processor coupled to a memory containing software;

an entropy decoder component coupled to the receiver and coupled to the video control component and configured to decode entropy encoded video data;

an inverse quantization component coupled to the entropy decoding component and configured to de-quantize quantized transform coefficients of residual prediction units obtained from the decoded entropy encoded video data;

an inverse transform component coupled to the inverse quantization component and configured to inverse transform the transform coefficients of residual prediction units from the inverse quantization component from a frequency domain to residual prediction units;

a motion compensation component coupled to the entropy decoding component and configured to form reconstructed prediction units;

an adder component coupled to the motion compensation component and the inverse transform component and configured to combine residual prediction units and reconstructed prediction units to form a reconstructed picture;

a deblock filter component comprising a first hardware accelerator, the deblock filter coupled to the adder component and the video control component and configured to perform deblock filtering on the reconstructed picture;

a SAO filter component comprising a second hardware component, the SAO filter coupled to the deblock filter component and coupled to the video control component, the SAO filter component configured to perform SAO filtering on a first non-overlapping region of the reconstructed picture using first SAO band parameters obtained from the decoded entropy encoded video data wherein the first SAO band parameters comprises a first sequence of values of magnitudes of SAO band offsets without sign followed by signs of only the non-zero values of magnitudes of the first SAO band offset values in the decoded entropy encoded video data;

a second SAO filter component coupled to the deblock filter component and coupled to the video control component, the second SAO filter component configured to perform SAO filtering on a second non-overlapping region of the reconstructed picture using second SAO band parameters obtained from the decoded entropy encoded video data wherein the second SAO band parameters comprises a second sequence of values of magnitudes of SAO band offsets without sign followed by signs of only the non-zero values of magnitudes of the second SAO band offset values in the decoded entropy encoded video data;

the video control component configured to operate the first hardware accelerator and the second hardware accelerator in a pipelined manner; and a display coupled to the SAO filter component and configured to display the reconstructed picture.

6. The system of claim 5 where the video control component and the first and second hardware accelerators are implemented on a single integrated circuit.

7. The system of claim 5 where the display is a plasma display, a liquid crystal display or a light emitting diode display.

8. A video system, comprising:
a video control component comprising a first processor coupled to a memory;
an entropy decoder component coupled to the receiver and coupled to the video control component and configured to decode entropy encoded video data;
an inverse quantization component coupled to the entropy decoding component and configured to de-quantize quantized transform coefficients of residual prediction units obtained from the decoded entropy encoded video data;
an inverse transform component coupled to the inverse quantization component and configured to inverse transform the transform coefficients of residual prediction units from the inverse quantization component from a frequency domain to residual prediction units;
a motion compensation component coupled to the entropy decoding component and configured to form reconstructed prediction units;
an adder component coupled to the motion compensation component and the inverse transform component and configured to combine residual prediction units and reconstructed prediction units to form a reconstructed picture;
a deblock filter component comprising a first hardware accelerator, the deblock filter coupled to the adder component and the video control component and configured to perform deblock filtering on the reconstructed picture;
a SAO filter component comprising a second hardware accelerator, the SAO filter coupled to the deblock filter component and coupled to the video control component, the SAO filter component configured to perform SAO filtering on a first non-overlapping region of the reconstructed picture using first SAO band parameters obtained from the decoded entropy encoded video data wherein the first SAO band parameters comprises a first sequence of values of magnitudes of SAO band offsets without sign followed by signs of only the non-zero values of magnitudes of the first SAO band offset values in the decoded entropy encoded video data;
the video control component configured to operate the first and second hardware accelerators in parallel; and
a display coupled to the SAO filter component and configured to display the reconstructed picture.

9. The system of claim 8 where the video control component and the first and second hardware accelerators are implemented on a single integrated circuit.

10. The system of claim 8 where the display is a plasma display, a liquid crystal display or a light emitting diode display.

* * * * *